Patented June 3, 1947

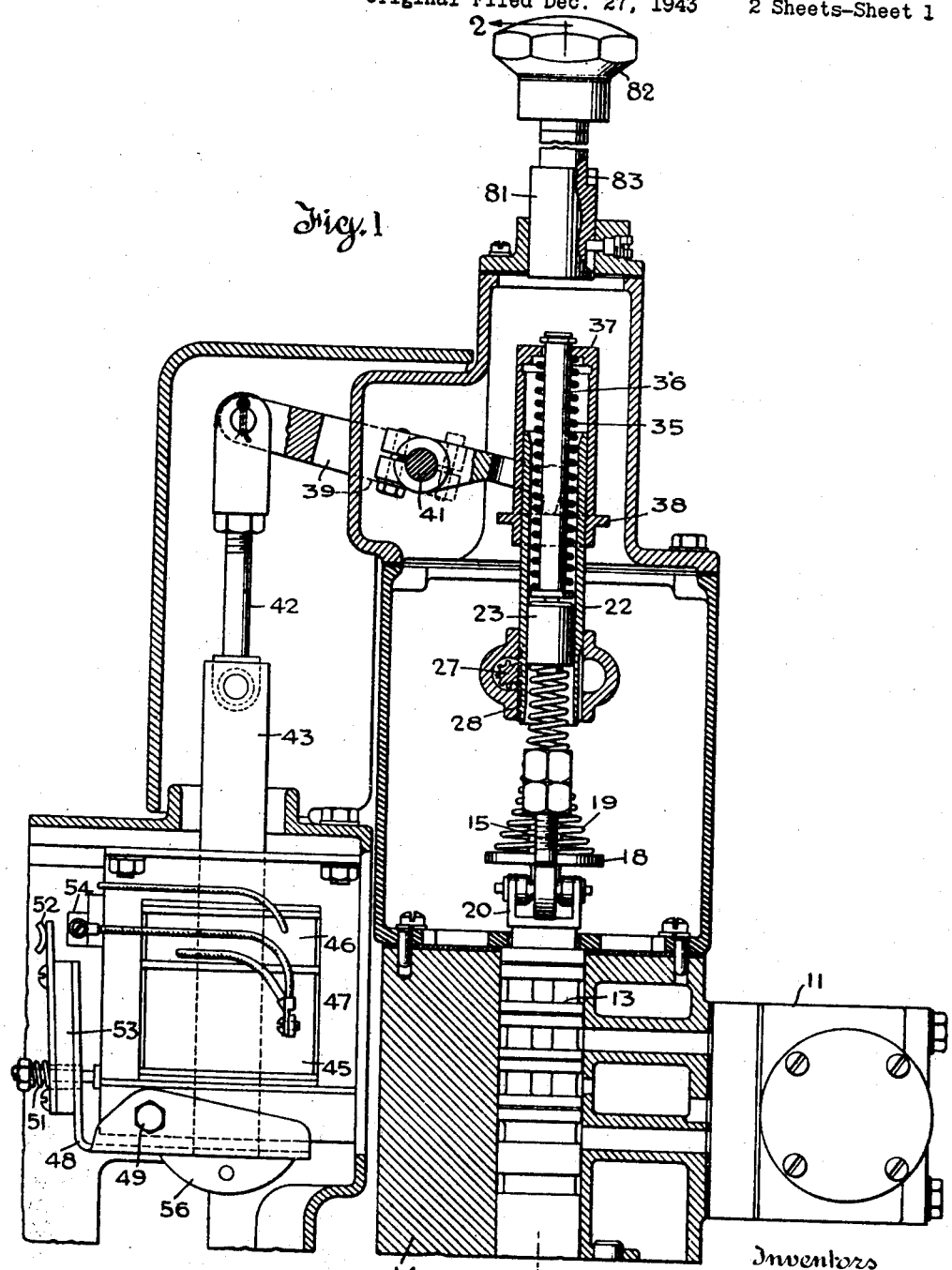

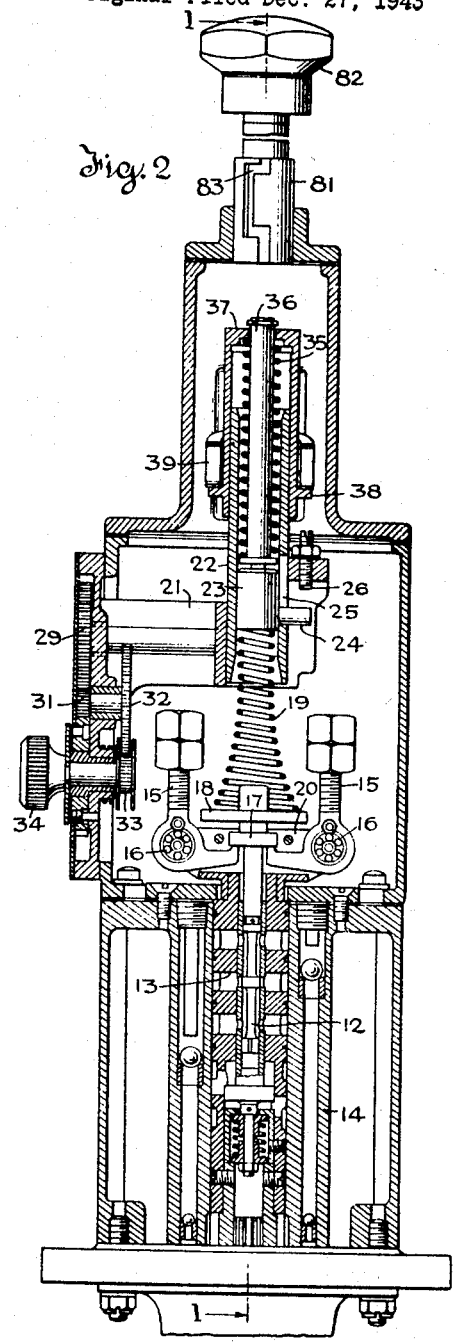

2,421,497

UNITED STATES PATENT OFFICE 2,421,497

GOVERNOR

Emil Grieshaber and William J. Johnson, Jr., Milwaukee, Wis., assignors to Nordberg Manufacturing Company, Milwaukee, Wis., a corporation of Wisconsin Original application December 27, 1943, Serial No. 515,867. Divided and this application November 29, 1944, Serial No. 565,689

3 Claims. (Cl. 264—3)

This invention relates to engine governors and particularly to a governor adapted to control under two different conditions, for example, when the engine is and is not subjected to load. The present application is a division of our application Serial No. 515,867, filed December 27, 1943.

In certain installations the primary control of the energy input of an engine is manual, but an overspeed governor has been considered essential, and it is not uncommon to use two governors per engine in order to secure full control.

The purposes of the present invention are (1) to provide a single governor which will act to limit speed at two different values, a low speed appropriate to idling or no-load conditions and a higher speed for operation under load; (2) to afford limited adjustment of the low speed setting, and ready manual adjustment over a wide range, of the higher speed-limiting setting, the two adjustments being wholly independent; and (3) to provide a shifting mechanism indifferent to the two adjustments and serving to select between the two settings.

Generally stated there is a shiftable seat for the speeder spring of the governor. This seat is biased toward a low speed stop by the speeder spring. The seat may be shifted in the other direction until arrested by an adjustable high speed stop, and such shift is effected by energizing a solenoid which stresses a loading spring heavy enough to move the spring seat full stroke and hold it against the high speed stop in any adjusted position thereof, despite the reaction of the speeder spring.

The solenoid may be energized by any suitable means. It should be noted that failure of the solenoid will set the governor for idling speed.

In the accompanying drawings the invention is illustrated as embodied in a Woodward governor.

Figure 1 is a vertical axial section through the governor on the line 1—1 of Fig. 2.

Figure 2 is a similar section on the line 2—2 of Fig. 1.

The Woodward governor chosen for illustration is of a type in which the fuel limiting control mechanism of the related engine is actuated by a servomotor generally indicated in Figure 1 by the numeral 11.

The controlling element is a piston valve 12 which regulates admission and exhaust flows through ports in a valve seat 13. This seat rotates but does not move axially in the governor housing 14. The upper end of the rotating valve seat 13 carries a yoke 20 upon which the fly-ball carriers 15 are pivoted by means of annular ball bearings 16. The fly-ball carriers have inwardly projecting arms which react upwardly on the outer race 17 of a ball thrust bearing carried by the upper end of the stem of valve 12. The stem 12 carries above the ball thrust bearing 17 a spring seat 18 upon which reacts the trumpet shaped speeder spring 19.

The parts so far described are of standard construction and function in their usual manner, so that no elaborate description of details is essential. The significant thing so far as the present invention is concerned is the presence of a fly-ball governor or its equivalent having a speeder spring 19. One of the features of novelty is the way in which the upper end of the speeder spring 19 is sustained.

Vertically guided in a guideway formed in bracket 21 sustained by the governor housing is a tube 22. Slidable within and guided by the tube 22 is a spring seat 23 having a laterally extending stem 24 which works in a longitudinal motion-limiting slot 25 formed in the tube 22. Carried by a portion of the bracket 21 is an adjustable stop screw 26 which is in the path of the stem 24 and serves to limit the upward movement of the spring seat 23 in the tube 22. Stop screw 26 determines the idling or low speed adjustment of the speeder spring 19, and this adjustment is in effect when the stem 24 is in engagement with the lower end of the stop screw 26. This is a semi-permanent adjustment and consequently the stop screw 26 is locked by a check nut as shown. The lower end of the slot 25 serves as the stop which determines the downward limit of motion of the spring seat 23 and establishes a high-speed limiting adjustment of the stress on the speeder spring 19. Adjustment is made by sliding the tube vertically.

The illustrated means for effecting the adjustment comprises a pinion 27 which engages rack teeth 28 formed on the tube 22. The pinion 27 may be rotated by a motion reducing gear train comprising the gears 29, 31, 32 and 33, the gear 33 being turned by a knob 34 which is accessible for manual adjustment. The arrangement is clearly shown in Figure 2 of the drawings. By turning the knob 34 the operator moves the tube 22 vertically and thus changes the position of the lower end of the slot 25.

The speeder spring 19 biases spring seat 23 upward until arrested by the low speed stop 26. To establish the high speed adjustment the spring seat 23 must be urged downward with a force sufficient to overpower the reaction of the speeder spring 19. The range of such motion is variable, being dependent on the adjustment of the sleeve 22. In order to accommodate the contemplated variations in the range of motion, the downward thrust is delivered through a coil compression spring 35. This reacts downward on a flange on the lower end of a stem 36 which is in thrust engagement with the spring seat 23. At its upper end the spring 35 is seated against the upper end of a cuplike thrust member 37 which is slidably mounted on the tube 22, and has near its lower end an encircling flange 38.

A lever 39 is fulcrumed at 41 in the governor housing and is forked at its righthand end to straddle the cup-shaped member 37 and engage the flange 38. The other end of the lever 39 is connected by a link 42 with the movable core or armature 43 of a solenoid motor. When the solenoid motor is deenergized, the lever 39 swings counterclockwise, relieving the stress on the spring 35 so that the spring seat 23 moves to the upper or low speed position. When the motor is energized the lever 39 turns clockwise to the position illustrated in Fig. 1, stressing spring 35 sufficiently to hold the spring seat 23 in the lowest position permitted by the existing adjustment of the sleeve 22, whatever that may be. At such times the stem 24 engages the lower end of the slot 25. The construction permits the actuating motor to move full stroke regardless of the existing adjustments.

Since the governor should shift to low-speed setting upon failure of any part of the system, it is desirable that the solenoid permit establishment of the low-speed setting when the solenoid is deenergized. Consequently the solenoid is energized constantly under normal running conditions, a consideration which controls its design.

The solenoid motor has two windings 45 and 46 wound on a laminated core 47 and connected in series. An L-shaped lever 48 fulcrumed at 49 and biased clockwise (as seen in Fig. 1) by spring 51 carries a contactor 52 which is insulated from the lever 49 at 53. When the lever is allowed to turn clockwise, it engages contacts 54 and 55 establishing a shunt path around winding 46. This condition subsists until armature 43 nears its uppermost position, at which time a head 56 carried by the armature 43 strikes lever 48 and turns it counterclockwise to the position shown in Fig. 1.

The energization of the solenoid motor may be controlled by any suitable switch device, such as that described in the parent application.

It is sometimes necessary, for test or warm up and similar purposes, to operate an engine above idling speed but not under load. To permit this, the governor shown in Figs. 1 and 2 can be locked in high-speed setting. A counterbored plunger 81 with actuating knob 82 and bayonet-lock slot 83 is guided in the top of the governor housing. It is shown locked in its upper or inactive position. It may be moved down manually and locked in a position in which thrust member 37 is held fully depressed. At such time the governor imposes the higher speed limit.

A preferred embodiment of the governor has been described in considerable detail, but merely to disclose the principles of the invention, the scope of which will be defined in the claims.

What is claimed is:

1. A speed responsive governor having a speeder spring; a shiftable seat against which said spring reacts; stops limiting the shift of said seat, the speeder spring serving to bias said seat toward one of said stops, and the other of said stops being adjustable; motor means having an effective stroke at least as long as the maximum range of motion of the spring seat between said stops; a second spring stonger than the speeder spring and forming an operative connection between the motor and spring seat through which the motor may force the spring seat against said other stop; and means for energizing and deenergizing said motor.

2. The combination of a speed responsive governor having a loading spring; a spring seat against which said spring reacts, said seat being shiftable to vary the loading characteristic of the spring; a pair of opposed stops, the first of which is normally fixed and arranged to sustain the spring seat against the thrust of said spring, and the second of which is adjustable to vary the range of shift of said spring seat in a direction to increase the loading on the spring; a motor for shifting the spring seat toward the second named stop; and a yielding connection between the motor and spring seat, said yielding connection being such as to overpower the spring.

3. The combination of a speed responsive governor having a loading spring; a spring seat against which said spring reacts, said seat being shiftable to vary the loading characteristic of the spring; a pair of opposed stops, the first of which is normally fixed and arranged to sustain the spring seat against the thrust of said spring, and the second of which serves to limit the range of shift of said spring seat in a direction to increase the loading on the spring; a motor for shifting the spring seat toward the second named stop; and a yielding connection between the motor and spring seat, said yielding connection being such as to overpower the spring.

EMIL GRIESHABER.
WILLIAM J. JOHNSON, Jr.

REFERENCES CITED

The following references are of record in the file of this patent:

UNITED STATES PATENTS

| Number | Name | Date |
| --- | --- | --- |
| 2,352,736 | Richmond | July 4, 1944 |
| 2,319,218 | Drake | May 18, 1943 |
| 2,296,177 | Newton | Sept. 15, 1942 |
| 2,365,204 | Martin | Dec. 19, 1944 |